United States Patent
X et al.

(10) Patent No.: US 11,888,814 B2
(45) Date of Patent: Jan. 30, 2024

(54) MANAGING ADDRESS SPACES ACROSS NETWORK ELEMENTS

(71) Applicant: Juniper Networks, Inc., Sunnyvale, CA (US)

(72) Inventors: Nirmal Antony X, Bangalore (IN); Sunil Madhaorao Gandhewar, Umarkhed (IN); Steven P. Onishi, Groton, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 397 days.

(21) Appl. No.: 16/210,907

(22) Filed: Dec. 5, 2018

(65) Prior Publication Data

US 2020/0186494 A1 Jun. 11, 2020

(51) Int. Cl.
*H04L 61/5061* (2022.01)
*H04L 41/0806* (2022.01)
(Continued)

(52) U.S. Cl.
CPC ...... *H04L 61/5061* (2022.05); *H04L 41/0806* (2013.01); *H04L 41/0886* (2013.01); *H04L 61/5014* (2022.05)

(58) Field of Classification Search
CPC ............. H04L 61/2061; H04L 41/0806; H04L 41/0886; H04L 61/2015
See application file for complete search history.

(56) References Cited

U.S. PATENT DOCUMENTS 6,880,000 B1 *  4/2005  Tominaga ......... H04L 29/12933
                                                        709/220
6,952,735 B1 * 10/2005  Aune ................ H04L 29/12009
                                                        709/228

(Continued)

FOREIGN PATENT DOCUMENTS

CN    1372748 A    10/2002
CN  101606133 A    12/2009
(Continued)

OTHER PUBLICATIONS

Droms, "Dynamic Host Configuration Protocol," RFC 2131, Network Working Group, IETF Standard, Internet Engineering Task Force, Mar. 1997, 46 pp.

(Continued)

*Primary Examiner* — John A Follansbee
*Assistant Examiner* — Raqiul A Choudhury
(74) *Attorney, Agent, or Firm* — Shumaker & Sieffert, P.A.

(57) ABSTRACT

In general, techniques are described for managing address spaces across network elements. A network device including a processor may be configured to perform the techniques. The processor may execute a pool manager that automatically distributes a first block of network addresses to a first network element acting, for a first network, as a first address allocation server to assign the first block of network addresses. The pool manager may further automatically distribute a second block of contiguous network addresses to a second network element acting, for a second network, as a second address allocation server. The pool manager may then dynamically manage a size of the first block of network addresses and a size of the second block of network addresses to address exhaustion of available network addresses within either or both of the first block of network addresses and the second block of network addresses.

17 Claims, 7 Drawing Sheets

(51) Int. Cl.
H04L 41/08 (2022.01)
H04L 61/5014 (2022.01)

(56) References Cited

U.S. PATENT DOCUMENTS

| | | | |
|---|---|---|---|
| 7,184,437 B1 | 2/2007 | Cole et al. | |
| 7,185,079 B1 | 2/2007 | Bainbridge et al. | |
| 8,046,522 B2 | 10/2011 | Sinclair et al. | |
| 10,893,019 B2 | 1/2021 | Xu et al. | |
| 2003/0142642 A1* | 7/2003 | Agrawal | H04L 29/12311 370/328 |
| 2004/0064520 A1* | 4/2004 | Takahashi | H04L 29/12273 709/208 |
| 2005/0076144 A1* | 4/2005 | Boylan | H04L 29/12283 709/245 |
| 2005/0097223 A1 | 5/2005 | Shen et al. | |
| 2007/0180120 A1* | 8/2007 | Bainbridge | H04L 29/12283 709/226 |
| 2011/0238793 A1* | 9/2011 | Bedare | H04L 45/586 709/220 |
| 2014/0059214 A1* | 2/2014 | Imamura | H04L 45/70 709/224 |
| 2017/0374025 A1* | 12/2017 | Pan | H04L 63/205 |
| 2019/0238500 A1 | 8/2019 | Xu et al. | |
| 2020/0021556 A1* | 1/2020 | Goelitz | H04L 61/2007 |

FOREIGN PATENT DOCUMENTS

| | | | |
|---|---|---|---|
| CN | 107809495 A | 3/2018 | |
| EP | 1208685 B1 | 5/2006 | |
| EP | 3499850 A1 | 6/2019 | |
| WO | 0117199 A1 | 3/2001 | |
| WO | 2012018728 A1 | 2/2012 | |
| WO | 2018045992 A1 | 3/2018 | |

OTHER PUBLICATIONS

Enns, "Network Configuration Protocol (NETCONF)," Internet Engineering Task Force (IETF), RFC 6241, Jun. 2011, 114pp.

Bjorklund, "YANG—A Data Modeling Language for the Network Configuration Protocol (NETCONF)," Internet Engineering Task Force (IETF), RFC 6020, Oct. 2010, 174 pp.

Xie et al., "ARPIM: IP Address Resource Pooling and Intelligent Management System for Broadband IP Networks," IEEE Communications Magazine, vol. 55, No. 6, Jun. 1, 2017, pp. 55-61.

Extended Search Report from counterpart European Application No. 19180554.8, dated Sep. 3, 2019, 9 pp.

Communication pursuant to Article 94(3) EPC dated Mar. 4, 2021 received in EP counterpart application No. 19180554.8, 6 pp.

Response to Extended Search Report dated Sep. 3, 2019 from counterpart European Application No. 19180554.8, filed Dec. 10, 2020, 15 pp.

Response to Communication pursuant to Article 94(3) EPC dated Mar. 4, 2021 received in EP counterpart application No. 19180554.8, filed Jun. 29, 2021, 14 pp.

First Office Action and Search Report, and translation thereof, from counterpart Chinese Application No. 201910569469.X dated Dec. 28, 2021, 11 pp.

Notice of Intent to Grant and Search Report from counterpart Chinese Application No. 201910569469.X dated Dec. 28, 2022, 6 pp., Translation provided for only the Search Report.

Notice of Intent to Grant and Text Intended to Grant from counterpart European Application No. 19180554.8 dated Feb. 17, 2023, 43 pp.

Notice of Intent to Grant and Text Intended to Grant from counterpart European Application No. 19180554.8 dated Sep. 30, 2022, 44 pp.

Response to Communication pursuant to Article 123(2) EPC dated Sep. 1, 2022, from counterpart European Application No. 19180554.8, filed Sep. 12, 2022, 66 pp.

Response to Summons to Attend Oral Proceedings pursuant to Rule 115(1) EPC dated Oct. 7, 2021, including Main Request, from European Patent Application No. 19180554.8] filed Aug. 9, 2022, 194 pp.

Second Office Action and Search Report, and translation thereof, from counterpart Chinese Application No. 201910569469.X dated Jul. 25, 2022, 11 pp.

Summons to Attend Oral Proceedings Pursuant to Rule 115(1) EPC from counterpart European Application No. 19180554.8 dated Oct. 7, 2021, 7 pp.

\* cited by examiner

MANAGING ADDRESS SPACES ACROSS NETWORK ELEMENTS

TECHNICAL FIELD

The invention relates to computer networks and, more particularly, managing address spaces across network elements.

BACKGROUND

A computer network generally includes a number of interconnected network elements. Large networks, such as the Internet, typically include a number of interconnected computer networks, which in this context are often referred to as sub-networks or subnets. These subnets are each assigned a range of network addresses that can be allocated to the individual client devices that reside in the respective subnet. A server or other device, such as a router operating as a broadband network gateway (BNG), a DHCP Server, a carrier grate network address translation (CGNAT) device, a layer two tunneling protocol (L2TP) network server (LNS) or any other device capable of execute access protocols, in each subnet may be responsible for allocating these network addresses in accordance with a network address allocation protocol, such as a dynamic host configuration protocol (DHCP), layer two tunneling protocol (L2TP), and/or point-to-point protocol (PPP).

Each BNG within a service provider network may be manually configured with a block of contiguous network addresses from a larger address space reserved for use by the service provider. Allocation of the addresses from each block of contiguous network address may vary widely between each BNG, resulting in potential inefficiencies that may prevent some BNGs with a high number of client devices attempting to connect to the respective subnet from access network services provided by the service provider. Reallocating each block of contiguous network addresses to adapt to fluctuating client device demand for network addresses may be time consuming (as its manual) and difficult (given that there are increasing numbers of mobile client devices that may move from subnet to subnet, thereby making it difficult to predict which blocks of contiguous network addresses should be modified to accommodate expected network address allocation, particularly to the extent that there are an increasingly limited number of IPv4 addresses).

SUMMARY

In general, techniques are described for automatically managing (e.g., distributing, reclaiming, defragmenting, and migrating) address spaces across network elements, such as broadband network gateways (BNGs). Rather than statically assign a block of contiguous network addresses (which may be referred to as a "network address block") to each DHCP server (which may be implemented by a router configured to operate as a broadband network gateway—BNG), various aspects of the techniques may automatically and dynamically manage network address block allocation to BNGs, thereby ensuring network address blocks allocated to each BNG are not underutilized or overutilized.

As such, the techniques may ensure that each BNG has a sufficient number of network addresses within each network address block that are available for allocation to respective client devices such that the client devices may access services provided by the service provider network. Further, because such allocation is automatic and dynamic, the techniques may avoid time consuming static reallocation of network addresses between network address blocks and adapt to the fluctuating demand for network addresses as client devices move between different subnets serviced by the different BNGs. In this respect, the techniques may improve the overall operation of the service provider network itself as the techniques may avoid over-allocation of network addresses that may prevent client devices from accessing the services provided by the service provider network.

In one aspect, various aspects of the techniques are directed to a method of managing an address space across network elements, the method comprising: automatically distribute a first block of network addresses to a first network element acting, for a first network, as a first address allocation server to assign the first block of network addresses to a first set of client devices coupled to the first network; automatically distribute a second block of contiguous network addresses to a second network element acting, for a second network, as a second address allocation server to assign the second block of network addresses to a second set of client devices coupled to the second network; and dynamically managing a size of the first block of network addresses and a size of the second block of network addresses to address inefficient distribution of available network addresses within either or both of the first block of network addresses and the second block of network addresses.

In another aspect, various aspects of the techniques are directed to a network device configured to manage an address space across network elements, the network device comprising: one or more processors configured to execute a pool manager, the pool manager configured to: automatically distribute a first block of network addresses to a first network element acting, for a first network, as a first address allocation server to assign the first block of network addresses to a first set of client devices coupled to the first network; automatically distribute a second block of contiguous network addresses to a second network element acting, for a second network, as a second address allocation server to assign the second block of network addresses to a second set of client devices coupled to the second network; and dynamically manage a size of the first block of network addresses and a size of the second block of network addresses to address inefficient distribution of available network addresses within either or both of the first block of network addresses and the second block of network addresses.

In another aspect, various aspects of the techniques are directed to a method of distributing a first block of network addresses, the method comprising: receiving, by a network address manager proxy executed by a first network element responsible for allocating the first block of network addresses within a first network and from a network address manager executed by a computing device, an allocation of the first block of network addresses; receiving, by the network address manager proxy and from the network address manager, one or more requests that manage a size of the first block of network addresses to address inefficient distribution of available network addresses within either or both of the first block of network addresses or a second block of network addresses distributed by a second network device for a second network; and adapting, by the network address manager proxy and responsive to the one or more requests, the size of the first block of network addresses.

In another aspect, various aspects of the techniques are directed to a network device configured to distribute a first block of network addresses for a first network, the network device comprising: one or more processors configured to execute a network address manager proxy, the network address manager proxy configured to: receive, from a network address manager executed by a computing device, an allocation of the first block of network addresses; receive one or more requests that manage a size of the first block of network addresses to address inefficient distribution of available network addresses within either or both of the first block of network addresses or a second block of network addresses distributed by a second network device for a second network; and adapt, responsive to the one or more requests, the size of the first block of network addresses.

The details of one or more aspects of the techniques are set forth in the accompanying drawings and the description below. Other features, objects, and advantages of the techniques will be apparent from the description and drawings, and from the claims.

DETAILED DESCRIPTION

Figure 1:
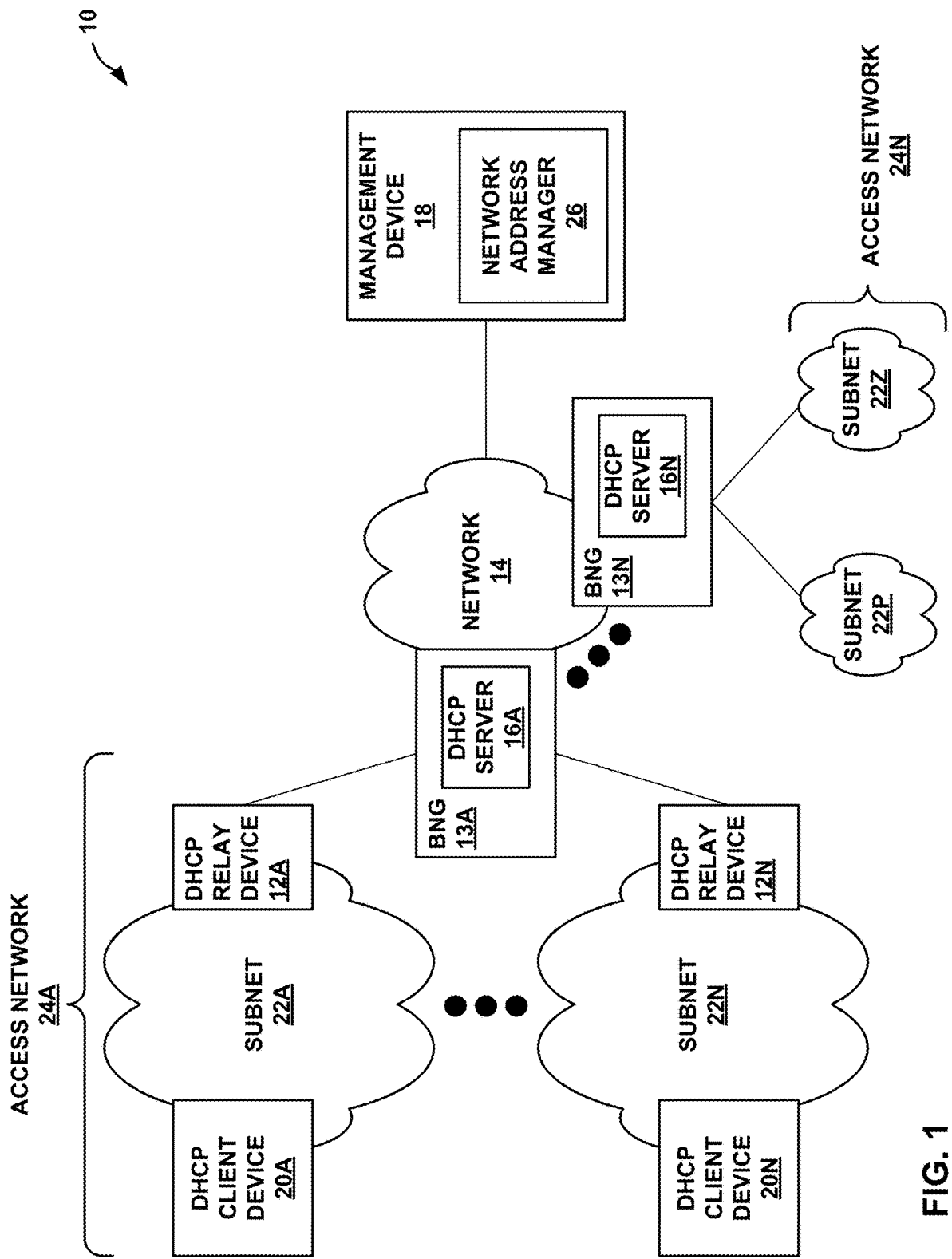
FIG. 1 is a block diagram illustrating an example network system configured to perform various aspects of the automated network address block management techniques described in this disclosure.

FIG. 1 is a block diagram illustrating a network system 10 configured to implement various aspects of the automated network address block management techniques described in this disclosure. In the example of FIG. 1, network system 10 includes DHCP relay devices 12A-12N ("DHCP relay devices 12"), broadband network gateways (BNGs) 13A-13N ("BNGs 13"), and management device 18. Although shown in the example of FIG. 1, as BNGs 13 (e.g., each of which are implemented by one or more routers), the techniques of this disclosure may be implemented by any network device/element, such as a server, a switch, a hub, a computer or any other device capable of allocating resources within a network system, such as network system 10. Moreover, while described with respect to a particular example protocol, e.g., a dynamic host configuration protocol (DHCP), the techniques may apply with respect to any protocol by which network addresses are allocated to network devices.

As shown further in the example of FIG. 1, network system 10 includes a network 14 to which BNGs 13 and a management device 18 couple. Network 14 may represent any publicly accessible computer network, such as the Internet. Network 14 may include a wide variety of inter-connected computing devices or nodes, such as web servers, print servers, application servers, data servers, workstations, desktop computers, laptop computers, cellular or other mobile devices (including so-called "smart phones"), smart speakers, smart televisions, gaming systems, and any other device cable of connecting to a computer network via a wireless and/or wired connection. Typically, these devices communicate with one another via a packet-based protocol, such as an Internet Protocol (IP)/Transmission Control Protocol (TCP). As a result, network 14 may represent or be referred to as a "packet-based" or an "IP packet-based" computer network.

Management device 18 may represent any device capable of interfacing with one or more network devices, such as BNGs 13, to manage or otherwise configure the network devices. Management device 18 may, as one example, include a so-called network management system (NMS). As another example, management device 18 may represent an element management system (EMS), which may operate at a level below NMSes in terms of features and capabilities to interface with network devices from different vendors (meaning that the EMS may be limited to a single vendor or a reduced subset of vendors typically supported by an NMS). Management device 18 may also obtain data (e.g., errors, issues, failures, availability, routing metrics, or any other data available via an interface—such as a command line interface (CLI)—presented by the network devices) associated with the network devices under management by management device 18.

Each of BNGs 13 include a respective DHCP server 16A-16N ("DHCP servers 16") that may represent a network device configured to allocate layer three network addresses (e.g., IP network addresses, including IPv4 addresses and IPv6 addresses, or any other network address, such as media access control—MAC—addresses) for network system 10. In particular, DHCP servers 16 may each maintain access to an address pool having a blocks of contiguous network address, such blocks as an Internet Protocol (IP) address pool. DHCP servers 16 may also each maintain access to other resources, such as configuration files that provide pertinent configuration information. Each of DHCP servers 16 may reserve an IP address within the IP address block (which may also be referred to as an "IP address pool") for use by a particular DHCP clients, such as DHCP client devices 20A-20N ("DHCP client devices 20"), in accordance with DHCP, as described in more detail below.

Network system 10 may further include DHCP client devices 20, each of which couple to one DHCP servers 16 via one or more connections (not shown) included within sub-network 22 ("subnet 22"). DHCP client devices 20 may each represent a subscriber access device, such as one or more of a Set-Top Box (STB), a cable modem, a digital subscriber line modem, an optical node unit (or optical line unit) or any other type of device commonly employed by subscribers to facilitate access to network 14 via access network 24. Although described with respect to modems or set-top boxes, DHCP client devices 20 may also represent different types of subscriber access devices, such as a personal computer, a laptop computer, a tablet computer, a workstation, a gaming system, a cellular phone or other mobile device (e.g., a so-called "smart phone"), a smart speaker, a smart television, a video digital assistant device, or any other device capable of accessing a network, such as network 14. These devices 20 may be "DHCP clients" in that these devices implement DHCP to request, as a client to DHCP servers or host devices 16, L3 network addresses (e.g., IPv4, IPv6, or MAC addresses) and other resources maintained by DHCP servers 16 useful or required for operating within network system 10.

Subnets 22A-22N ("subnets 22") may each represent a portion or a sub-network of access network 24, hence the name "subnet." Access network 24A is referred to as an access network given that this network enables client devices (not shown in the example of FIG. 1 for ease of illustration purposes) coupled to DHCP client devices 20 to access network 14. Generally, access network 24 implements the Internet protocol (IP), and with respect to IP, subnets or IP subnets, such as subnets 22, may be identified by an IP address prefix.

An IP subnet may represent a "network area" in that the IP subnet may be identified by a contiguous set of IP addresses or an IP prefix that defines a distinct area within an IP address space of larger access network 24A. The IPv4 address space comprises $2^{32}$ distinct IP addresses, as each IP address may correspond to a 32-bit binary number. In some examples, an IP address is presented in four eight bit binary numbers (or, in other words, four bytes) with each eight-bit binary number or byte separated by a period (.), which is a notation referred to as a quad-dotted decimal representation. For example, one IP address may be presented as 10.0.0.1. However, as a byte may represent a number as large as $2^8-1$ or $255_{10}$, each byte may represent a range of numbers from 0 to 255 in decimal, such that each IP address may vary from 0.0.0.0 to 255.255.255.255 again in quad-dotted decimal representation or notation.

An IP prefix identifies a subset of addresses with the IP address space and those addresses may be assigned to devices within a particular area of larger access network 24. An IP prefix usually identifies a contiguous set of IP addresses within the IP address space. For example, an IP prefix may identify a contiguous set of IP addresses from 10.0.0.1 to 10.0.0.255. This IP prefix may be represented by a routing prefix or 10.0.0 followed by a subnet mask identifier (which in this instance may be represented as $24_{10}$ to indicate that the first 24 bits should be 1's within the subnet mask, e.g., 255.255.255.0 in quad-dotted decimal notation), where the prefix and scope identifier may be separated by a slash (/). The IP prefix may therefore be presented as 10.0.0/24 suggesting that only the first 24 bits of the 32-bit IP address are necessary to reach the IP subnet (or area) corresponding to the IP prefix. In this instance, the IP prefix may define a routing prefix and may represent a summarized version of the contiguous set of IP addresses.

According to DHCP, each of subnets 22 requires either a DHCP server, such as DHCP servers 16, or a DHCP relay device, such as DHCP relay devices 12A-12N ("DHCP relay devices 12"), by which to request and assign IP addresses to network devices, such as DHCP client devices 20, operating within the respective subnet. As DHCP servers may maintain network resources for a large number of DHCP client devices, often, for small subnets, network administrators will utilize one or more DHCP servers or server clusters to service a number of subnets. To do so, the network administrators may maintain one DHCP server, such as a respective one of DHCP servers 16, and then configure multiple DHCP relay devices 12, one or more for each subnet, to relay DHCP messages from DHCP clients 20 located within the respective one of the subnets to a respective one of DHCP servers 16 or server cluster. More information regarding DHCP, including the different types of messages, can be found in request for comments (RFC) 2131, by R. Droms of Bucknell University, entitled "Dynamic Host Configuration Protocol," dated March 1997, the entire contents of which are hereby incorporated by reference in their entirety.

In these instances, a router or other network device (such as a digital subscriber line access multiplexer (DSLAM), a broadband service access node (B SAN), or a multi-service access node (MSAN)) already present within each subnet may provide the DHCP relay service as an optional service that the network administrators may enable in this context. In this respect, DHCP relay device 12 may represent a router or some other similar network device, such as a DSLAM, a BSAN, or an MSAN, that provides the DHCP relay service as an optional service. Alternatively, DHCP relay device 12 may represent a dedicated relay device and may represent any device capable of relaying DHCP messages in the manner described below in more detail. Thus, DHCP relay device 12 may represent any intermediate network device that is positioned between DHCP client devices 20 and DHCP servers 16, and that implements DHCP to relay DHCP messages between DHCP clients 20 and DHCP server 16.

While described herein with respect to DHCP servers 16 in which DHCP relay devices 12 forward DHCP communications, the techniques may be employed by DHCP server 16 in instances where DHCP client devices 20 reside in the same subnet or network as DHCP server 16. Further, although not shown for ease of illustration purposes relative to access networks 24B-24N (where access network 24N is shown as including subnets 22P-22Z), subnets 22P-22Z may each include a DHCP relay device 12P-12Z that function similarly to DHCP relay devices 12A-12N to relay DHCP messages between DHCP client devices 20P-20Z (which are also not shown for ease of illustration purposes) and BNG 13N.

Each of BNGs 13 may be manually configured with a block of contiguous network addresses from a larger address space reserved for use by a service provider. Allocation of the addresses from each block of contiguous network address may vary widely between each of BNGs 13, resulting in potential inefficiencies that may prevent some of BNGs 13 with a high number of network elements (such as DHCP client devices 20) attempting to connect to the respective subnet from access network services provided by the service provider. Reallocating each block of contiguous network addresses to adapt to fluctuating network element demand for network addresses may be time consuming (as its manual) and difficult (given that there are increasing numbers of mobile network elements that may move from subnet to subnet, thereby making it difficult to predict which blocks of contiguous network addresses should be modified to accommodate expected network address allocation).

In accordance with the techniques described in this disclosure, management device 18 may dynamically manage (e.g., distribute, reclaim, defragment, and migrate) address spaces across network elements, such as BNGs 13. As shown in the example of FIG. 1, management device 18 includes a network address manager 26 that is configured to perform the dynamic management of the address spaces across BNGs 13, and more specifically, DHCP servers 16. While described with respect to DHCP, the techniques may be performed with respect to other protocols, such as a layer two tunneling protocol (L2TP) and/or a point-to-point protocol (PPP). Moreover, although described with respect to executing on management device 18, network address manager 26 may execute on any device, including as a standalone application executed by any computing device either locally or within a virtual machine positioned in the network (e.g., the so-called "cloud"), as part of a software defined network (SDN), a docker container, or within a network functions virtualization (NFV) context.

In operation, network address manager 26 may automatically assign a first block of network addresses to DHCP server 16A, thereby acting (as noted above) as an address distribution server to distribute, for access network 24A, the first block of network addresses to DHCP servers 16. That is, network address manager 26 may maintain an overall address space assigned for use throughout network 14. In order to assign the first block of network addresses to DHCP server 16A, network address manager 26 may identify a block of network addresses that are available (meaning, unassigned to any other DHCP server 16) within the overall address space.

Upon locating an available block of network addresses, network address manager 26 may interface with DHCP server 16A (possibly via a NETCONF session executing over gRPC, REST, or telemetry interface) and specify the appropriate commands to define this available block of network addresses as the first block of network addresses for use within access network 24A. In some examples, network address manager 26 may specify an upper network address and a lower network address, thereby defining the first block of network addresses as a first contiguous block of network addresses. Network address manager 26 may indicate, within the locally maintained representation of the overall address space available for use within network 14, that the first block of network addresses is unavailable and in use by DHCP server 16A (and/or by BNG 13A).

Network address manager 26 may also automatically assign a second block of network addresses to DHCP server 16N, thereby acting (as noted above) as an address distribution server to distribute, for access network 24N, the first block of network addresses to DHCP servers 16. As used herein, automatically refers to a programmatic and/or rule-based assignment that occurs without direct oversight or intervention from a network administrator or other operator. Again, network address manager 26 may perform, when automatically assigning the second block of network addresses, the above operations described above when assigning the first block of network addresses, which may update the representation of the overall network address space to denote that the second block of network addresses (which may include a second contiguous block of network addresses) is unavailable and in use by DHCP server 16N (and/or BNG 13N).

Next, network address manager 26 may dynamically manage a size of the first block of network addresses and a size of the second block of network addresses to address inefficient distribution of available network addresses within either or both of the first block of network addresses and the second block of network addresses. Network address manager 26 may either receive, request, or otherwise obtain data indicating the extent to which each of DHCP servers 16A and 16N have distributed the first and second blocks of network addresses for use by DHCP clients 20 (which for ease of discussion may generally be assumed to also refer to the DHCP clients of access network 24N that are not shown in FIG. 1). In other words, network address manager 26 may obtain data indicating a number of network addresses available for assignment from the first and second blocks of network addresses to access networks 24A and 24N (which may be referred to as "available network addresses").

When there are inefficient distributions of available network addresses, network address manager 26 may reclaim available network addresses from DHCP servers 16A and/or 16N or allocate additional blocks of network addresses from the overall address space to DHCP servers 16A and/or 16N. In some examples, DHCP servers 16A and/or 16N may interface with network address manager 26 to indicate that a number of available network addresses is at or below a low available address (LAA) threshold. Responsive to determining that the number of available network addresses is at or below the LAA threshold, the network address manager 26 may allocate an additional block of network addresses to the DHCP servers 16A and/or 16N. In some examples, DHCP servers 16A and/or 16N may interface with network address manager 26 to indicate that the number of distributed network addresses is at or below a low distributed address (LDA) threshold. Responsive to determining that the number of distributed network addresses is at or below the LDA threshold, the network address manager 26 may reclaim some portion (e.g., a sub-block of available network addresses) of the first and/or second block of network addresses.

Although described with respect to a LAA threshold, various aspects of the techniques may be implemented with respect to a high distributed address (HDA) threshold in which one or more DHCP servers 16 interface with network address manager 26 when a number of distributed addresses are equal to or above the HDA threshold. The HDA threshold may indicate when additional blocks of network addresses are to be provisioned, form the overall network address space, by network address manager 26 to the one or more of DHCP servers 26. Further, while described with respect to the LDA threshold, various aspects of the techniques may be implemented with respect to a high available address (HAA) threshold in which one or more DHCP servers 16 interface with network address manager 26 when a number of available addresses are equal to or above the HAA threshold. The HAA threshold may indicate when some subset of the already allocated blocks of network addresses are available for a reclaim operation by network address manager 26.

In this respect, rather than statically assign a block of contiguous network addresses (which may be referred to as a "network address block") to each DHCP server 16, network address manager 26 may automatically and dynamically manage network address block allocation to BNGs 13, thereby ensuring network address blocks allocated to each of BNGs 13 are not underutilized or overutilized. As such, network address manager 26 may ensure that each of BNGs 13 has a sufficient number of network addresses within each network address block that are available for allocation to respective DHCP client devices 20 such that the DHCP client devices 20 may access services provided by service provider network 10.

Further, because such allocation is automatic and dynamic, network address manager 26 may avoid time consuming manual reallocation of network addresses between network address blocks and adapt to the fluctuating demand for network addresses as DHCP client devices 20 move between different subnets 22 serviced by each of BNGs 13. In this respect, the techniques may improve the overall operation of the service provider network 10 itself as the techniques may avoid overallocation of network addresses that may prevent DHCP client devices 20 from accessing the services provided by service provider network 10.

Figure 2A:
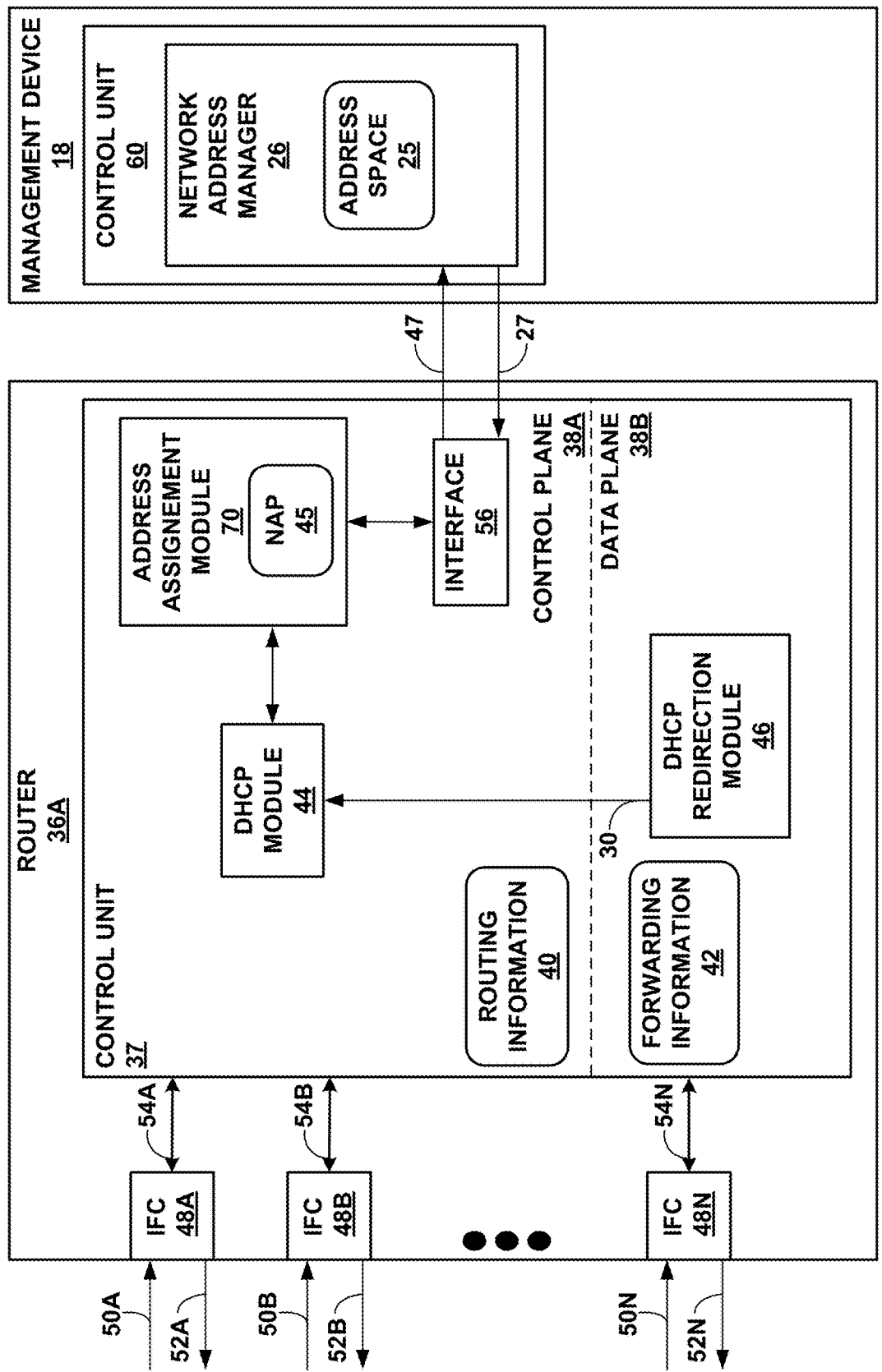
FIGS. 2A and 2B are block diagrams illustrating, in more detail, examples of the BNGs and the management device shown in FIG. 1 that are configured to perform various aspects of the network address space management techniques described in this disclosure.
Figure 2B:
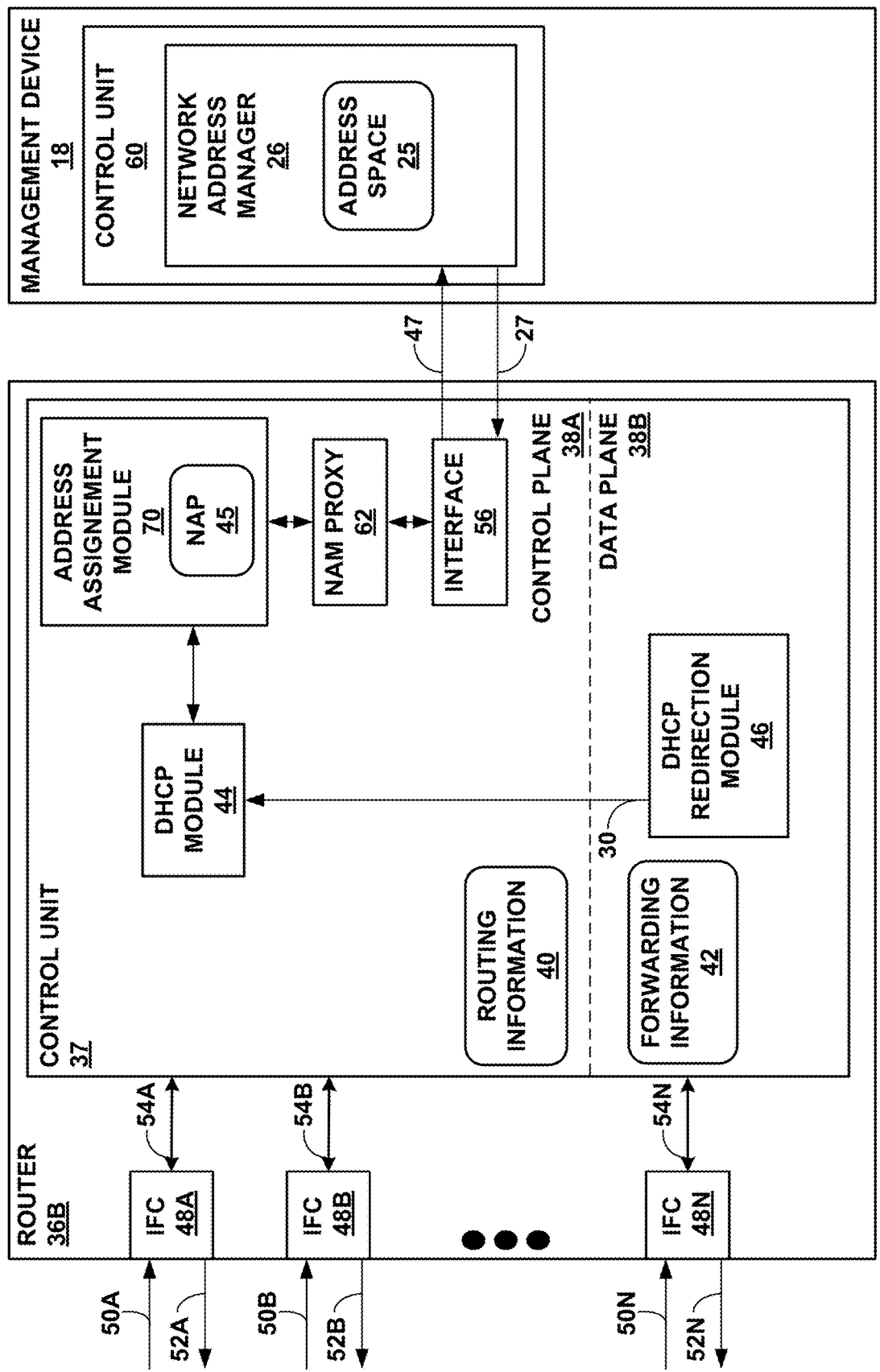

FIGS. 2A and 2B are block diagrams illustrating, in more detail, examples of the BNGs and the management device shown in FIG. 1 that are configured to perform various aspects of the network address space management techniques described in this disclosure. Referring first to the example of FIG. 2A, router 36A may represent an example of one of BNGs 13 (such as BNG 13A). A router may refer to any network device that performs routing functions to route data units through a network. Router 36A may route particular types of data units referred to as packets and as a result may be referred to as a "packet-based router."

Moreover, router 36A may implement layer 3 (L3) protocols or network layer protocols (where L3 refers to the L3 of the open system interconnection (OSI) model), such as an Internet Protocol (IP), and route packets according to layer 3 information. Consequently, router 36A may also be referred to as a "layer 3 router", a "network layer router," or an "IP router." For purposes of illustration, router 36A may be described below within the context of exemplary network system 10 of FIG. 1.

Additionally, as noted above, router 36A may represent an example of a broadband network gateway (BNG), which may also be referred to as a broadband remote access server (BRAS). Acting as a BNG, router 36A may aggregate user sessions from access network 24, and perform policy management and IP quality of service (QoS) with respect to the user sessions.

As shown in FIG. 2A, router 36A includes a control unit 37. Control unit 37 may comprise one or more processors or other circuitry (not shown in FIG. 2A) that execute software instructions, such as those used to define a software or computer program, stored to a computer-readable storage medium (again, not shown in FIG. 2A), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Control unit 37 may also include, either as an alternative to the one or more processors or in addition to the one or more processors, dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 37 may be divided into two logical or physical "planes" to include a first control or routing plane 38A and a second data or forwarding plane 38B. That is, control unit 37 may implement two separate functionalities, e.g., the routing and forwarding functionalities, either logically, e.g., as separate software instances executing on the same set of hardware components, or physically, e.g., as separate physical dedicated hardware components (which may be referred to as "packet forwarding engines," abbreviated as "PFEs") that either statically implement the functionality in hardware or dynamically execute software or a computer program to implement the functionality.

Control plane 38A of control unit 37 may execute the routing functionality of router 36. In this respect, control plane 38A may represent hardware and/or software of control unit 37 that implements routing protocols (not shown in FIG. 2A) by which routing information 40 may be determined. Routing information 40 may include information defining a topology of a network, such as network 14. Control plane 38A may resolve the topology defined by routing information 40 to select or determine one or more routes through network 14. Control plane 38A may then update data plane 38B with these routes, where data plane 38B maintains these routes as forwarding information 42. Routing component 26 may generate the forwarding information (FIB) 42 in the form of a radix tree having leaf nodes that represent destinations within the network. U.S. Pat. No. 7,184,437 provides details on an exemplary embodiment of a router that utilizes a radix tree for route resolution, the contents of which is incorporated herein by reference in its entirety. Forwarding or data plane 38B may represent hardware (e.g., the above noted PFEs) and/or software of control unit 37 that forwards network traffic in accordance with forwarding information 42.

Control plane 38A may further comprise a DHCP module 44 that implements DHCP in the manner described above with respect to DHCP servers 16 of FIG. 1. In other words, DHCP module 44 may receive DHCP messages, such as DHCP messages 30, and process these messages in accordance with DHCP. More information concerning DHCP in general as well as particulars concerning DHCP messages, such as DHCP discover, offer, request, release, renew, acknowledge and other messages can be found in Request for Comments (RFC) 2131, titled "Dynamic Host Configuration Protocol," dated March 1997, herein incorporated by reference in its entirety.

In addition, control pane 38A may include an address assignment module 70, which may be configured to manage network address block 45. Address assignment module 70 may represent a unit configured to execute an authentication, authorization, and accounting (AAA) protocol by which to authenticate users of client devices 20, authorize (upon successful authentication of the user) access to network 14 via access networks 24, and perform accounting with respect to access to network 14 and other services provided by the service provider. Examples of AAA protocols include remote access dial-in user service (RADIUS) and the successor to RADIUS referred to as "diameter." Address assignment module 70 may interface with an AAA server (not shown in FIG. 1 for ease of illustration purposes) to perform the AAA services.

Data plane 38B may comprise a DHCP redirection module 46. DHCP redirection module 46 may represent a software and/or hardware module that inspects incoming network traffic to determine if this incoming network traffic represents DHCP messages. DHCP redirection module 46 may, in some instances, comprise a logic programmed within a forwarding ASIC (representative of PFEs) or other component of data plane 38B that filters traffic based on headers of the incoming network traffic or any other similar mechanism that data plane 38B may employ to distinguish particular types of network traffic from other types of network traffic.

DHCP redirection module 46 may for example comprise one or more filters programmed within data plane 38B that listens on one or more ports assigned for DHCP communications, e.g., ports 67 and 68. DHCP redirection module 46 may comprise one filter that listens on these DHCP ports 67 and 68, and upon receiving traffic over these ports, DHCP redirection module 46 may determine an address to which the DHCP communications are transmitted. DHCP clients 20 may, for example, transmit the DHCP messages by broadcasting these DHCP messages over one of the above ports. DHCP redirection module 46 may, therefore, filter packets that indicate a broadcast address, e.g., an address of zero, and designate one of the DHCP ports. DHCP messages from server 16 may specify particular interfaces of router 36A by address and also designate one of the above DHCP ports. DHCP redirection module 46 may likewise filter DHCP messages that include one of the interface addresses and one of the DHCP ports. DHCP redirection module 46 may therefore filter packets in this manner and forward DHCP messages 30 to control unit 37.

As further shown in the example of FIG. 2A, router 36A includes Interface Cards (IFCs) 48A-48N ("IFCs 48") that receive and send packet flows or network traffic via inbound network links 50A-50N ("inbound network links 50") and outbound network links 52A-52N ("outbound network links 52"), respectively. IFCs 48 are typically coupled to network links 50, 52 via a number of interface ports (not shown), and forward and receive packets and control information from control unit 37 via a respective one of paths 54A-54N ("paths 54"). Each physical interface of IFCs 48 is typically assigned a unique identifier by control unit 37, and multiple logical interfaces having unique identifiers may be assigned to each physical interface, where each logical interface represents as a distinct input or output interface for different network traffic. These logical interfaces may represent VLANs and each VLAN may be assigned a unique VLAN tag. Often, each particular context in which a DHCP client devices resides is assigned a VLAN tag to differentiate between client devices of different context.

Router 36A may include a chassis (not shown in the example of FIG. 2A) having a number of slots for receiving a set of cards, including IFCs 48. Each card may be inserted into a corresponding slot of a chassis for communicably coupling the card to a control unit 36 via a bus, backplane, or other electrical communication mechanism.

As further shown in the example of FIG. 2A, control unit 37 of router 36A may be configured to execute or otherwise provide an interface 56 (which may execute or otherwise maintain a NETCONF session with network address manager 26 or some other session, such as telemetry session). Interface 56 may represent a unit with which network address manager 26 may interact with control unit 37 to dynamically manage address assignment module 70 in accordance with various aspects of the techniques.

Management device 18 may include a control unit 60, which in terms of hardware, may be similar to control unit 37 except that in some instances control unit 60 does not include a data plane 38B (and as such only includes a control plane 38A). Control unit 60 may represent any form of hardware (including circuitry) that may be configured to execute network address manager 26. Network address manager 26 may manage address space 25 coherently across several different network elements, such BNGs 13, as described above.

Network address manager 26 may initially configured network address blocks, such as network address pool 45 ("NAP 45"), within BNGs 13. NAP 45 may refer to one or more blocks that are linked to one another (via pointers or other software constructs). In the example of FIG. 2A, network address manager 26 may allocate NAB 45 to address assignment module 70 via interactions address assignment module 70 via interface 56. In some examples, network address manager 26 may allocate a small NAP 45 to address assignment module 70. Network address manager 26 may issue requests 27 via interface 56 to determine a number of available network addresses remaining for allocation from NAP 45. Based on the number of available network addresses remaining for allocation from NAP 45, network address manager 26 may issue requests 27 to allocate additional addresses or reclaim unused network addresses, thereby increasing or decreasing a size of NAP 45 in terms of a number of addresses.

To configure NAP 45, network address manager 26 may define so-called address "pool" sets, where each pool set refers to a contiguous block of network addresses. For example, network address manager 26 may internally maintain the following:

Pool Set ps_group 1={pool 1, pool 2, pool 3}

Pool Set ps_group 2={pool 4, pool 5, pool 6}

Network address manager 26 may also internally maintain groups of multiple BNGs 13. For example, network address manager 26 may internally maintain the following:

BNG Set BG_group 1={BNG 1, BNG 2, BNG 3}

BNG Set BG_group 2={BNG 4, BNG 5, BNG 6}

Network address manager 26 may assign a pool set to one of BNGs 13 and/or a BNG Set. When a pool set is assigned to one of BNGs 13 or a set of BNGs 13 (referred to as a BNG Set), network address manager 26 assigns addresses only from that pool set to the pertaining one or more (in the case of a BNG set) of BNGs 13. In other words, network address manager 26 may create a set of network elements that associates the first network element to the second network element, and jointly manage the size of the NAPs 45 within the first and second network elements by issuing requests to the set of network elements, thereby allocating or reclaiming addresses from the assigned pool set. The techniques described in this disclosure may in this way offer flexibility in planning the subscriber edge network. Further, the techniques described in this disclosure may facilitate redistributing the addresses from the pool sets among the BNGs 13 from the BNG set.

To configure the address pools in BNGs 13, network address manager 26 may define the addresses/address ranges via requests 27 to BNGs 13 as discussed in more detail below. Network address manager 26 may specify addresses from address space 25 as blocks (or, in other words, chunks) in a configurable chunk, e.g. subnet blocked in order such as /28, /24, /20 and so on. The schema for the chunk to be assigned to a given one of BNGs 13 will be either a range or a subnet as below:

```
<ADDR POOL DISTRIBUTE>
    <IP>
        <Range> subnet</Range>
        <low> range </low>
        <high> range </high>
        <Pool name> name </Pool name>
    </IP>
</ADDR POOL DISTRIBUTE>
```

Alternatively, the schema for assigning NAP 45 may follow the subnet schema, per the following:

```
<ADDR POOL DISTRIBUTE>
    <IP>
        <Subnet> subnet </Subnet>
        <Pool name> name </Pool name>
    </IP>
</ADDR POOL DISTRIBUTE>
```

The following is the ADDR POOL DISTRIBUTE schema for available address pools:

| Object | Meaning |
| --- | --- |
| IP | IP type, e.g., IPv4 or IPv6 |
| Range | Range of the address pool. |
| Low | Low range of the address pool. |
| High | High range of the address pool. |
| Pool name | Pool name in Pool Manager. This is used to fast mapping of the address back in Pool Manager. |
| Subnet | Subnet available for allocation. |

Network address manager 26 may issue various requests 27 and receive data 47 representative of messages, statistics (e.g., NAP 45 address utilization by allocations to DHCP client devices 20) or any other data available via interface 56 using a network configuration protocol (NETCONF),REST, telemetry, or any other protocol that facilitates interactions with network devices. In the context of NETCONF, network address manager 26 may utilize NETCONF on top of a remote procedure call (RPC) layer and a so-called "YANG" data modeling language (which is convertible to XML and JSON formats) for configuration data (within requests 27) and protocol messages (conveying requests 27 and data 47). More information regarding NETCONF can be found in Request for Comments (RFC) 6241, entitled "Network Configuration Protocol (NETCONF)," dated June 2011, the entire contents of which are hereby incorporated by reference as if set forth in its entirety. More information regarding YANG can be found in RFC 6020, entitled "YANG—A Data Modeling Language for the Network Configuration Protocol (NETCONF)," dates October 2010, the entire contents of which are hereby incorporated by reference as if set forth in its entirety.

As noted above with respect to the example of FIG. 1, network address manager 26 may determine that the available network addresses within NAP 45 is at or below a threshold (e.g., the above LAA threshold). Network address manager 26 may additionally determine any requirements and rules associated with NAP 45 or some subset of the addresses within NAP 45. Network address manager 26 may issue requests 27 to query DHCP module 44 regarding the rules and requirements associated with NAP 45. Example requirements and rules include the address pool that has to be distributed from network address manager 26 to router 36A to match a particular subnet.

Network address manager 26 may next obtain, based on the requirements and rules, an additional block of network addresses from the associated pool sets of the BNG. For example, consider a rule in which some or all of the addresses within NAP 45 should match a particular subnet. As another example, consider a requirement in which some or all of the addresses within NAP 45 are required to have a addresses with a minimum number of contiguous address allocations for a pool where the customer device needs a framed pool of addresses. As yet another example, consider a requirement in which some or all of the addresses within NAP 45 are static IP addresses in which DHCP client devices 20 retain the same IP address anywhere in the network. Network address manager 26 may automatically move an assigned static network address that is associated with a particular DHCP client device 20 from, as one example, NAP 45 of BNG 13A to a NAP of BNG 13N responsive to the particular DHCP client device 20 attempting to access access network 24N.

Network address manager 26 may then automatically assign another block of network addresses to address assignment module 70, thereby increasing a number of available network addresses within NAP 45. In this way, network address manager 26 may, based on the requirements, allocate the additional block of available addresses (as denoted in address space 25) to address assignment module 70. In the event network address manager 26 runs into insufficient numbers of available addresses or is unable to match addresses to address rules from address space 25, network address manager 26 (which may also be referred to as a "pool manager 26") may issue an address reclaim request 27 to one or more other BNGs 13 (e.g., BNG 13N) or BNG's in the BNG set to reclaim available addresses from those other BNGs 13 that are not currently being utilized.

As such, network address manager 26 may dynamically manage the size of the NAP 45 within, as one example, BNG 13N by issuing a reclaim request 27 to BNG 13N (which is assumed to be similar, if not substantially similar, to BNG 13A shown in the examples of either FIG. 2A or 2B) requesting a portion of NAP 45 within BNG 13N be returned for distribution to another network element (i.e., BNG 13A in this example). Network address manager 26 may obtain, from BNG 13N, an indication 47 that the portion of NAP 45 has been released, and therefore reclaimed.

When a number of available addresses are below a threshold within address space 25 and/or a pool set at network address manager 26, network address manager 26 may, in order to allocate to BNGs 13 that have a number of available addresses within NAPs 45 below the LAA threshold, send a reclaim request 27 to each of the BNG 13 in a BNG Set. Network address manager 26 may receive indications 47 that various addresses have been reclaimed by reading through the schema (which may be noted by the syntax "Reclaim-Get"). The Reclaim-Get schema may contain attributes (which may refer to the rules and requirements), such as subnet range, network matching rule, etc. Network address manager 26 may support following two modes by which to issue the reclaim requests:

Non Preemptive reclaim; and
Preemptive reclaim.

In a non-preemptive reclaim, BNGs 13 may release a number of available addresses that are below the LDA threshold to network address manager 26. However, BNGs 13 are not required (or in other words, it is not mandatory for the BNGs 13) to honor the reclaim request.

The reclaimed available addresses (which may also be referred to as "address pools" or "pools") may be represented as a linked chain of reclaimed pools. BNGs 13 may reclaim pools until the LDA threshold is reached or total addresses in free pool list are exhausted (meaning, as one example, that the total number of addresses in free pool list is lesser than high watermark).

When the available pools are running short and the total number of reclaimable addresses from free address pool chain is lesser LDA threshold, network address manager 26 may determine that the address pools are fragmented and are in-use, and thereby reclaim the addresses by splitting out a subset of new pools from a fragmented pool for reclaim. The size of the pool to be split out is determined by a configurable number which determines the requirement of a number of addresses that has to be contiguous and free that can to be split out as subset pools.

The split up fragmented in-use address pool is now chained and the same address pool name is maintained. For an outside system, such as a RADIUS, the chained fragmented pool is a black box and appears as if it is a single address pool referred to using the pool name. In other words, the chaining of a fragmented pool is local within the address pool on BNG 13N. Network address manager 26 may maintain the split out pools from various fragmented in-use pools by chaining the remaining pools together (using pointers or other software constructs to reference the location of the network available address), leaving the split out pools available for reclaim. The amount of processing of splitting out of available address pools from fragmented in-use pools may depend on the size of contiguous available addresses requirement. The smaller the configured size of contiguous available addresses that can be split out, the higher the processing required to split out the subset pools.

Figure 3:
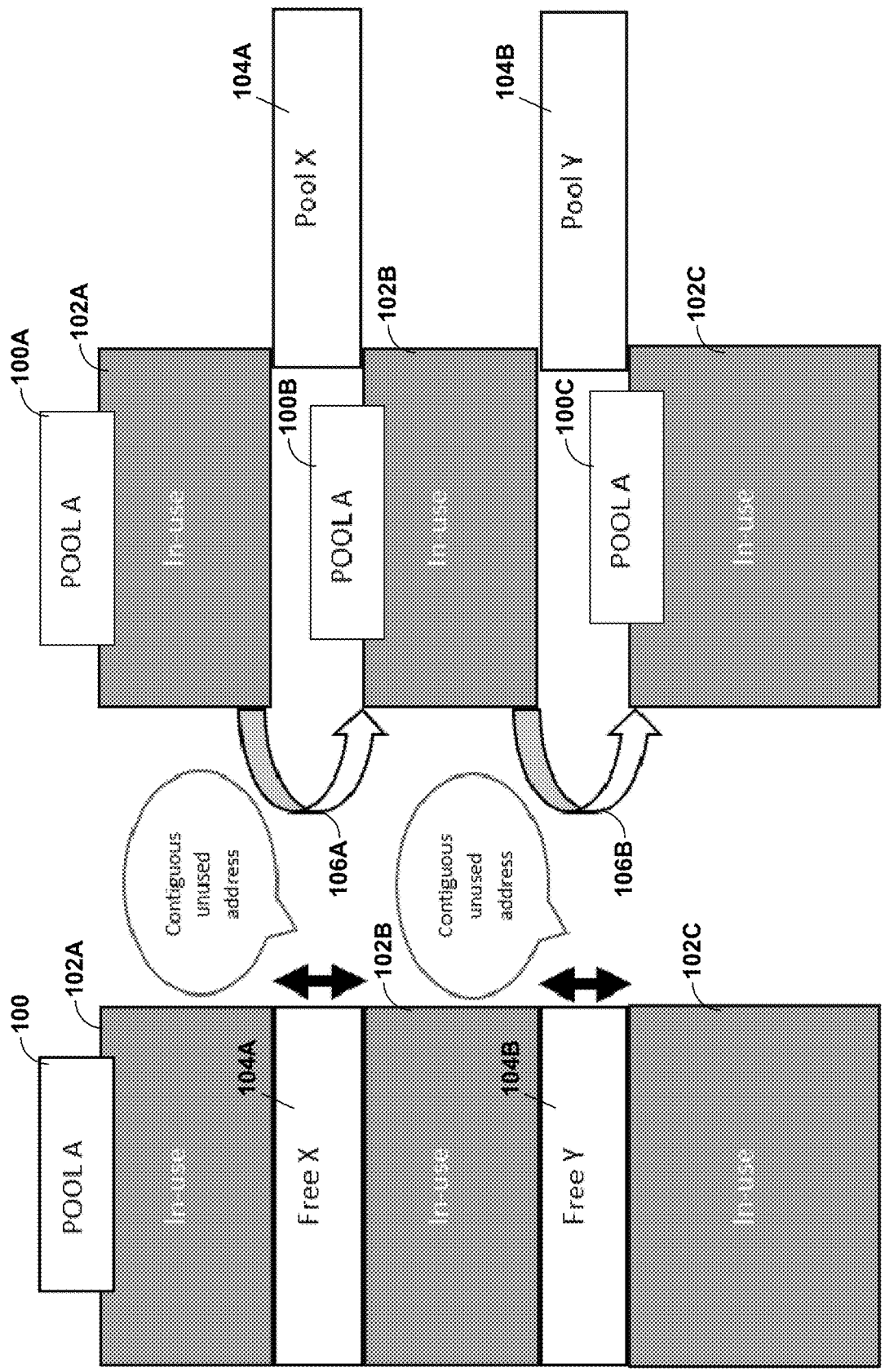
FIG. 3 is a block diagrams illustrating how the network address manager may split out subset pools from a fragmented network address pool in accordance with various aspects of the techniques described in this disclosure.

FIG. 3 is a block diagrams illustrating how the network address manager may split out subset pools from a fragmented network address pool in accordance with various aspects of the techniques described in this disclosure. In the example of FIG. 3, pool 100 is named "Pool A" and includes distributed address blocks 102A-102C. As further shown in the example of FIG. 3, pool 100 includes a contiguous block of unused addresses (or, in other words, available address block) 104A between distributed address blocks 102A and 102B, and available address block 104B between distributed address blocks 102B and 102C. As such, pool 100 is fragmented, thereby preventing reclaim of available address blocks 104A and 104B when the size of available address blocks 104A and 104B does not meet the lower size requirement of a given reclaim request 27.

As such, network address manager 26 may update pool 100 within address space 25 to link distributed address block 106A to distributed address block 106B, and distributed address block 106B to distributed address block 106C. Network address manager 26 may use pointers 106A and 106B to perform the links between respective distributed address block 106A to distributed address block 106B and distributed address block 106B to distributed address block 106C. Network address manager 26 may then reclaim available address blocks 104A and 104B. Network address manager 26 may then identify pool 100 using three distinct linked address blocks 100A-100C, each of which may be included under "Pool A" to maintain that this pool has, outside of network address manager 26, not been divided into three distinct address blocks.

When the reconfigure of the pool as shown in FIG. 3 is not successful (e.g., there was a collision because a new subscriber has been assigned an address from pool 104A or 104B), network address manager 26 may not reclaim one or more of pools 104A and 104B. Network address manager 26 may periodically attempt to the reclaim pools 104A and 104B when there were collisions as DHCP client devices 20 may release the assigned addresses. In some examples, network address manager 26 may mark pool 100 as "draining," which may reduce or prevent allocation of addresses from pool 100 to avoid allocation of new addresses from the pool while network address manager 26 is splitting out pools 104A and 104B. Once the reclaim process is complete, network address manager 26 may remove the "draining" status so that BNG 13A may allocate addresses from pools 100A-100C (which is still denoted as "pool 100" within the network).

When network address manager 26 sends a preemptive reclaim request 27 to BNGs 13 with a number of addresses, BNGs 13 must honor the request by sending any pools that meet the requisite number of addresses. In some instances, BNGs 13 may revoke the addresses from DHCP client devices 20, thereby logging out the subscribers. The preemptive reclaim request 27 allow network address manager 26 to defragment highly fragmented pools. Subscribers holding contiguous addresses on a pool are terminated and the freed subset of addresses becomes eligible to be holed out as a pool available for reclaim using the above noted process. The fragmented in-use pool is chained as explained with respect to FIG. 3 above. Network address manager 26 may also use preemptive reclaim request 27 when a pool needs to be migrated to another network rule or to the static address space.

Below is the reclaim request schema which is an operation request to the BNGs 13 to process the address pool reclamation.

```
<Reclaim Request>
    <reclaim type> type </reclaim type>
    <range> subnet <range>
        <Rule> rule 1 expr </Rule>
            <Rule> rule 2 expr </Rule>
    <Reclaim Request>
```

| Object name | Meaning |
|---|---|
| Reclaim Request | Schema for reclaim request. |
| Reclaim type | Type of reclaim |
| | 0-Non Preemptive reclaim |
| | 1-Preemptive reclaim |
| Range | Subnet required. |

Below is the reclaim reply schema with freed up address spaces for a reclaim get request from network address manager 26. Network address manager 26 may notify BNG 13A on successfully reclaiming the pools based on the reply for reclaim get. BNG 13A may then purge the freed up list that were returned to network address manager 26.

The following is the reclaim schema is used to reclaim the addresses that are released by the BNG.

```
<Reclaim Get>
    <IP>
        <Range> subnet </Range>
        <low> range </low>
        <high>range </high>
    </IP>
</Reclaim Get>
<Reclaim Get>
    <IP>
        <address> subnet </address>
    </IP>
</Reclaim Get>
```

| Object name | Meaning |
|---|---|
| Reclaim Get | schema for Reclaim retrieval of address ranges/addresses. |
| IP | IP type e.g., IPv4 or IPv6 |
| Range | Range of the address pool. |
| Low | Low range of the address pool. |
| High | High range of the address pool. |
| Address | Address available for allocation. |

In this way, network address manager 26 may reclaim available address blocks and then redistribute reclaimed available address block to BNGs 13 that have limited numbers of available addresses. In the case where network address manager 26 is not able to provide additional available address blocks to BNG 13A even after a reclaim request, network address manager 26 may send a notification indicating "Resource Unavailability" to the BNG 13A which has no more available addresses within NAP 45.

Via the foregoing different schemas, network address manager 26 may support pool migration. That is, network address manager 26 may migrate a pool from one pool set to another pool set (in real time or near real time). Once the pool is migrated, the available addresses on the migrated pool can be allocated to the assigned BNG or BNG set corresponding to the pool set. Network address manager 26 may seamlessly retain the released addresses belonging to the pool to the pool now in the new pool set.

To perform the migration, network address manager 26 may unconfigure the pool from BNGs 13 on which the old pool set was configured and then move the unconfigured pool to the new pool set. When DHCP client devices 20 are using the addresses from the migrated pool, BNGs 13 may reclaim the used addresses from the migrated pool. When reclamation of all addresses is successful, network address manager 26 may migrate the pool.

Referring next to the example of FIG. 2B, router 36B is another example of one of BNGs 13 (e.g., BNG 13A) and is similar to router 36A shown in the example of FIG. 2A except that control unit 37 of router 36B is configured to execute an additional module denoted as network address manager (NAM) proxy 62. NAM proxy 62 may represent a unit that receives and responds to the NETCONF requests from network address manager 26. NAM proxy 62 may be of limited features (e.g., only configured to respond to the NETCONF requests) or may be full featured (e.g., in addition to responding to the NETCONF requests, NAM proxy 62 may perform defragmentation of NAP 45 to reclaim addresses and providing the addresses back to network address manager 26).

When operating as a limited NAM proxy 62, network address manager 26 may periodically (and/or responsive to some condition) poll NAM proxy 62 to receive details about NAP 45. When operating as a fully featured NAM proxy 62, NAM proxy 62 may report the details about NAP 45 periodically (and/or responsive to certain conditions).

In any event, NAM proxy 62 may execute on behalf of network address manager 26 in various ways. In some examples, NAM proxy 62 may poll address assignment module 44 to determine a number of available addresses within NAP 45 and issue requests (as data 47) for additional addresses when the number of available addresses is below the LAA threshold. NAM proxy 62 may also interface with address assignment module 44 to identify a number of distributed addresses within NAP 45 and issue a message 47 notifying network address manager 26 when the number of distributed addresses is below the LDA threshold.

In other words, NAM proxy 62 may perform one or more of the following operations:
Establish NETCONF sessions with network address manager 26;
Facilitate Edit/Configure/Delete/Get operations on the NETCONF sessions;
Notify network address manager 26 on available addresses below low watermark threshold (e.g., LAA threshold);
On a Reclaim request, defragment local pools when free addresses are more than high watermark threshold (or the number of distributed addresses is below the LDA threshold); and
On pre-emptive reclaim request and there is not enough free addresses, initiate logouts of selected subscribers to facilitate address reclaim.

Pool Set and BNG Set features do not need any functionality on NAM proxy 62, and as a result pool set and BNG set features can run independently on network address manager 26. In addition, there are options to configure the low watermark threshold and the high watermark threshold. The low watermark threshold (e.g., LAA threshold) and the high watermark threshold (e.g., LDA threshold) may be defined on a BNG set, BNG, or one a pool level. The various thresholds can be configured either on NAM proxy 62 or on BNG 13A, depending upon the richness of the BNG support.

In the case of NAM proxy 62 executing on BNG 13A, NAM proxy 62 may, as noted above, automatically notify network address manager 26 when the watermark thresholds are surpassed. When free/available addresses are reaching the low watermark threshold, NAM proxy 62 may initiate a request to network address manager 26 for more addresses. When free/available addresses are above the high watermark threshold, NAM proxy 62 may release the available addresses above the high watermark threshold to network address manager 26 via the defragmentation and/or reclaim process described above.

NAM proxy 62 may reduce the computational burden of executing network address manager 26, as the processing for defragmentation and other operations are offloaded to NAM proxy 62. In addition, network address manager 26 may, when NAM proxy 62 is full featured, no longer expend computation resources on polling, which may also allow network address manager 26 to be executed on less computationally proficient management devices, thereby allowing for wider distribution of network address managers 26.

The foregoing techniques may provide one or more of the following benefits:
Single Application for the ISP provider to manage the subscriber address pools across ISP provider's BNG edge routers;
Potentially no manual intervention required for address distribution, defragmentation and reclamation, etc;
Flexibility in operation such as Pool Set, BNG Set and tagging of Pool Set to BNG Set;
Flexibility of migration pools across pool set groups;
Standard YANG data-modelling formats (XML, JSON convertible) which are globally supported by all products;
Apart from running as a standalone application, the techniques can also be easily integrated to an NMS solution;
May be easily integrated to a SDN/NFV Cloud solution;
Support for Static and dynamic address group support and migration across;
Network matching rule support in address request and reclaim;
Configurable address chunking distribution with multiple modes;
Flexible Reclaim functionality with multiple modes:
User selectable Reclaim facility; and
Multiple options to choose address chunking for distribution.

Although various aspects of the techniques are described with respect to interfacing with DHCP module 44 executed by control plane 38A, the techniques may permit network address manager 26 and/or NAM proxy 62 to interface with DHCP modules 44 executed by, to provide a couple of examples, a service card located in a separate service plane (separate from the control plane 38A and data plane 38B) of routers 36A or 36B, or data plane 38B. In some examples, routers 36A and 36B interface directly (meaning through a direct connection) with a dedicated DHCP server, and NAM proxy 62 and/or network address manager 26 may interface with the dedicated DHCP server via routers 36A and/or 36B.

Furthermore, although described with respect to a single network address manager 26, one or more management devices may execute two or more network address managers 26 to provide redundancy and/or high availability for the address management. Network address managers 26 may communicate state changes to address space 25 (e.g., via a commit chain or other structure by which to maintain atomicity of operations) between the multiple network address managers 26. In this respect, network address managers 26 may maintain synchronization of state.

In the example of failure of only one network address manager 26, an administrator may restart the virtual machine executing network address manager 26 and configure newly launched network address manager 26 to reference the previous database of the failed network address managers 26. The new network address manager 26 may read the old database and thereby recreate the environment.

Further, when BNGs 13 themselves include redundancy where, for example, BNG 13A is partially backed up on BNG 13B and BNG 13C, network address managers 26 may consider each portion of BNG 13A as a separate BNG, creating an abstraction in which BNG 13A is considered as BNG 13A-1, BNG 13A-2, and BNG 13A-3. Network address managers 26 may gather data 47 in the manner described above from each of BNG 13A-1, BNG 13A-2, and BNG 13A-3 and merge data 47.

Figure 4:
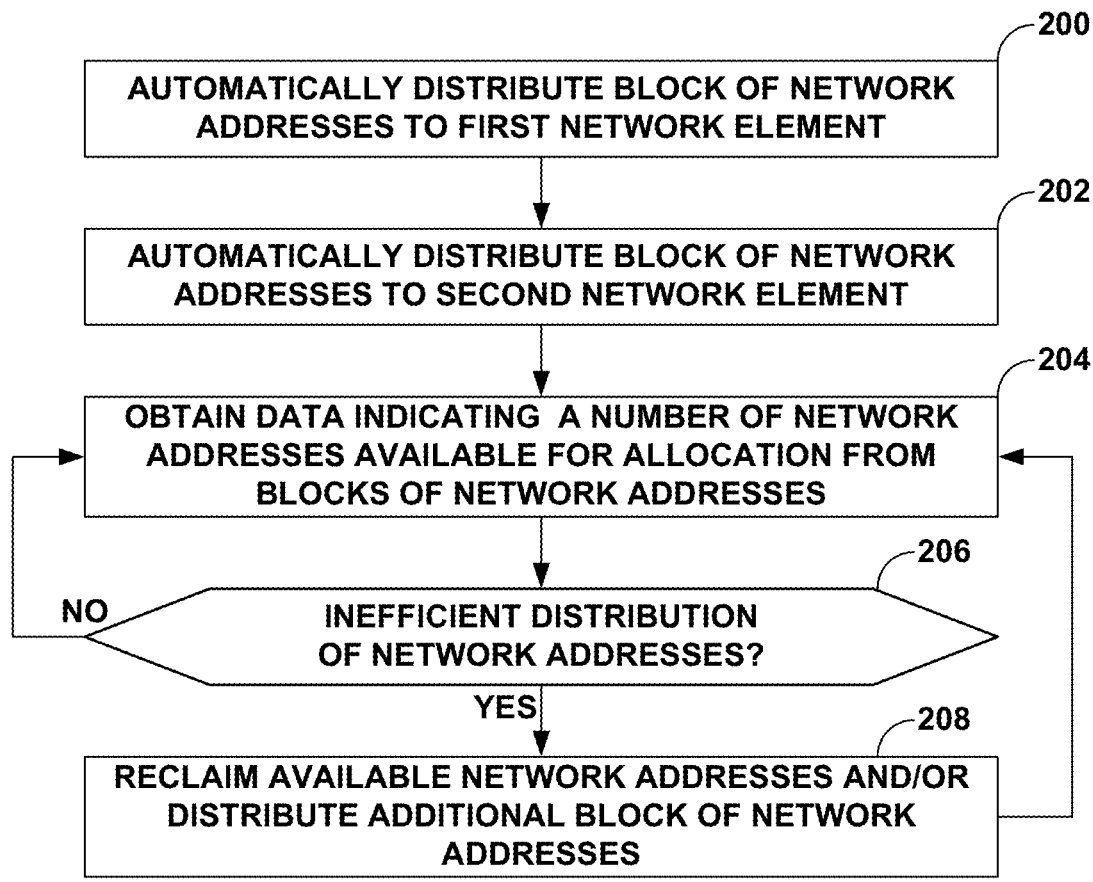
FIG. 4 is a flowchart illustrating example operation of network address manager configured to execute in accordance with various aspects of the automated address management techniques described in this disclosure.

FIG. 4 is a flowchart illustrating example operation of network address manager configured to execute in accordance with various aspects of the automated address management techniques described in this disclosure. Network address manager 26 (as shown in FIGS. 1-2B) may automatically assign a first block of network addresses to DHCP server 16A, which acts (as noted above as) an address allocation server to allocate, for access network 24A, the first block of network addresses to DHCP client devices 20A-20N (200). In order to assign the first block of network addresses to DHCP server 16A, network address manager 26 may identify a block of network addresses that are available (meaning, unassigned to any other DHCP server 16) within the overall address space.

Upon locating an available block of network addresses, network address manager 26 may interface with DHCP server 16A (possibly via a NETCONF session) and specify the appropriate commands to distribute this available block of network addresses as the first block of network addresses for allocation within access network 24A. In some examples, network address manager 26 may specify an upper network address and a lower network address, thereby defining the first block of network addresses as a first contiguous block of network addresses. Network address manager 26 may indicate, within the locally maintained representation of the overall address space available for use within network 14, that the first block of network addresses is unavailable and in use by DHCP server 16A (and/or by BNG 13A).

Network address manager 26 may also automatically assign a second block of network addresses to DHCP server 16N, which acts (as noted above as) an address allocation server to allocate, for access network 24N, the first block of network addresses to DHCP client devices coupled to access network 24N (which are not shown for ease of illustration purposes) (202). Again, network address manager 26 may perform, when automatically distributing the second block of network addresses, the above operations described above when distributing the first block of network addresses, which may update the representation of the overall network address space to denote that the second block of network addresses (which may include a second contiguous block of network addresses) is unavailable and in use by DHCP server 16N (and/or BNG 13N).

Next, network address manager 26 may dynamically manage a size of the first block of network addresses and a size of the second block of network addresses to address inefficient distribution of available network addresses within either or both of the first block of network addresses and the second block of network addresses. Network address manager 26 may either receive, request, or otherwise obtain data indicating the extent to which each of DHCP servers 16A and 16N have allocated the first and second blocks of network addresses for use by DHCP clients 20 (which for ease of discussion may generally be assumed to also refer to the DHCP clients of access network 24N that are not shown in FIG. 1). In other words, network address manager 26 may obtain data indicating a number of network addresses available for allocation from the first and second blocks of network addresses to access networks 24A and 24N (which may be referred to as "available network addresses") (204).

Based on the data indicating the number of network addresses available for allocation form the first and second block of network addresses, network address manager 26 may determine whether there is an inefficient distribution of network addresses across DHCP servers 16A and 16N (in this example) (206). When there are not inefficient distributions of network address ("NO" 206), network address manager 26 may continue to collect the data indicating a number of network addresses available for distribution form the blocks of network address and determine whether there is an inefficient distribution of network addresses across the DHCP servers (204, 206). When there are inefficient distributions of available network addresses ("YES" 206), network address manager 26 may reclaim available network addresses from DHCP servers 16A and/or 16N or allocate additional blocks of network addresses from the overall address space to DHCP servers 16A and/or 16N (208).

In some examples, DHCP servers 16A and/or 16N may interface with network address manager 26 to indicate that a number of available network addresses is at or below a low available address (LAA) threshold. Responsive to determining that the number of available network addresses is at or below the LAA threshold, the network address manager 26 may allocate an additional block of network addresses to the DHCP servers 16A and/or 16N. In some examples, DHCP servers 16A and/or 16N may interface with network address manager 26 to indicate that the number of distributed network addresses is at or below a low distributed address (LDA) threshold. Responsive to determining that the number of distributed network addresses is at or below the LDA threshold, the network address manager 26 may reclaim some portion (e.g., a sub-block of available network addresses) of the first and/or second block of network addresses.

Figure 5:
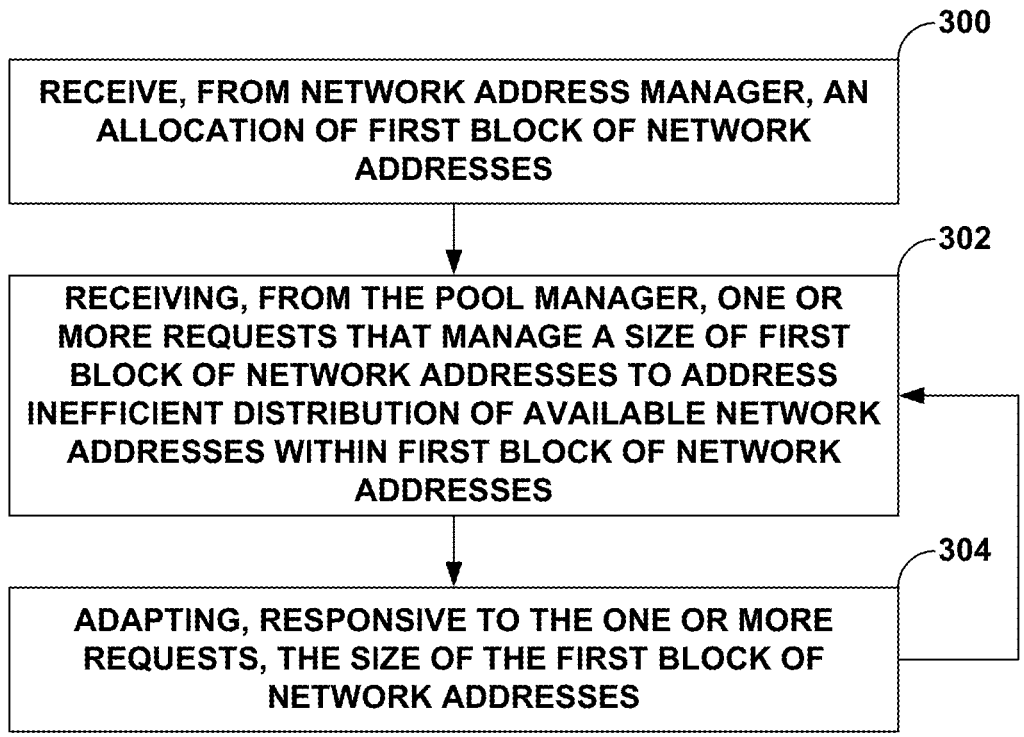
FIG. 5 is a flowchart illustrating example operation of a broadband network gateway configured to execute in accordance with various aspects of the automated address management techniques described in this disclosure.

FIG. 5 is a flowchart illustrating example operation of a broadband network gateway configured to execute in accordance with various aspects of the automated address management techniques described in this disclosure. BNG 13A may, as described above in more detail with respect to example BNG 13A shown in FIG. 2B as router 36B, execute a network address manager proxy 62, which may receive, from network address manager 26 executed by a computing device, such as management device 18, an allocation of the first block of network addresses (e.g., NAB 45) (300).

NAM proxy 62 may next receive, from network address manager 26, one or more requests 27 that manage a size of the first block of network addresses to address inefficient distribution of available network addresses within either or both of NAP 45 or a second block of network addresses distributed by BNG 13N for access network 26N (302). NAM proxy 62 may next, as described above in more detail, adapt, by the network address manager proxy and responsive to the one or more requests, the size of the NAP 45 (304).

Further, there are instances in which there may be available network addresses, but none or few of the available network addresses match the rule for a subnet. In these instances, network address manager 26 may reclaim network addresses that match the rule for the subnet in response to a request by one of BNGs 13 for a block of network addresses that match the rule for the subnet.

Figure 6:
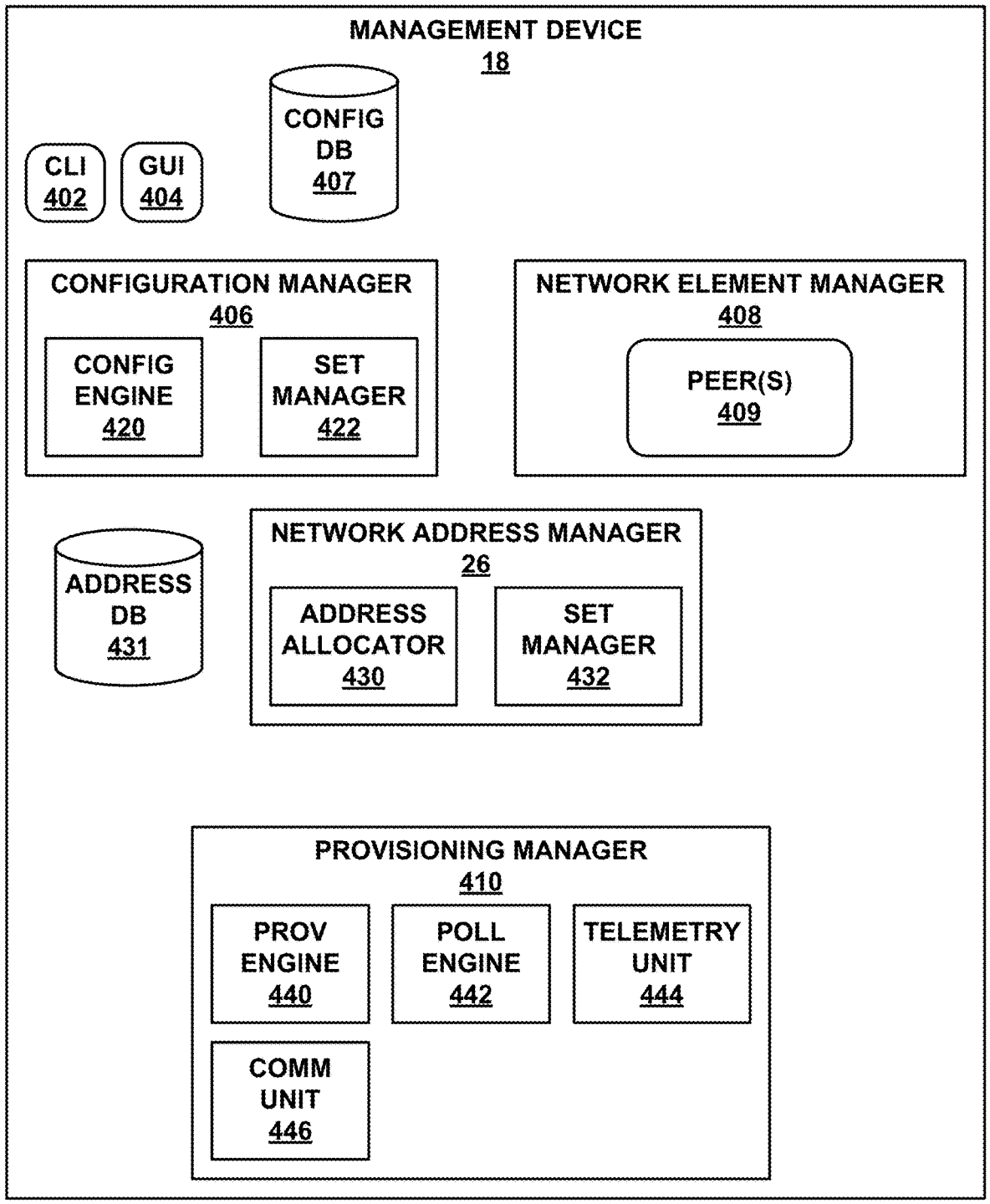
FIG. 6 is a block diagram illustrating the management device of FIG. 1-2B in more detail.

FIG. 6 is a block diagram illustrating the management device of FIG. 1-2B in more detail. As shown in the example of FIG. 6, management device 18 includes a command line interface (CLI) 402, a graphical user interface (GUI) 404, a configuration manager 406, a network element manager 408, network address manager 26, and a provisioning manager 410. Although not shown in the example of FIG. 6, control unit 60 may be configured to execute each of modules 402-410 and 26. CLI 402 and GUI 404 may represent interfaces with which an administrator or other network operator may interact to configure or otherwise specify data related to each of modules 402-410 and 26.

Configuration manager 406 may represent a unit configured to map operator configuration of network address manager 26 associated with authorized network elements or other entities, IP address blocks (e.g., prefixes), transport layer security, address allocation, thresholding, and provisioning behavior to the various functional components. Configuration manager 406 may enable configuration of pools, pool sets, BNG sets, and association of BNG sets with pool sets.

Configuration manager 406 may include a configuration ("CONFIG") engine 420 and a set manager 422. Config engine 420 may represent a unit configured to perform the various configurations noted above, validate configuration data stored to configuration database ("CONFIG DB") 407, and otherwise implement the various configuration strategies on behalf of configuration manager 406. Set manager 422 may represent a unit configured to manage the pool sets, BNG sets and the relationships (or, in other words, associations) between the pool sets and BNG sets as well as any other sets.

Network element manager 408 may represent a unit configured to orchestrate the activities of pool management for the registering elements 409 or other entities (which are shown in the example of FIG. 6 as "peer(s) 409"), and registering elements or other entities, including address block allocation, pool monitoring, and peer provisioning.

Network address manager 26 may represent a unit configured to partition configured prefixes into smaller blocks of addresses for distribution as well as intelligently distribute the address blocks according to criteria specified by administrators via CLI 402 and/or GUI 404. Network address manager 26 may include an address allocation 430 and a set manager 432. Address allocator 430 may represent a unit configured to allocate the network address blocks as described above. Set manager 432 may represent a unit configured to manage the various sets in a similar, if not substantially similar, way to that described above with respect to set manager 422, and may maintain a data structure identifying which addresses of address space 25 stored to address database (DB) 431 are allocated to which set or set association.

Provisioning manager 410 may represent a unit configured to initiate provisioning and deprovisioning of NAP 45 using a given provisioning mechanism of a corresponding one of peers 409. Provisioning manager 410 may include a provisioning engine 440, a poll engine 442, a telemetry unit 444, and a communication unit 446. Provisioning engine 440 may represent a unit configured to generate the various commands noted above by which to interface with routers 36A/36B. Poll engine 442 may represent a unit configured to poll peers 409 in order to obtain the various numbers of available and/or allocated network addresses as well as any other data described above that is relevant to performing the various aspects of the techniques described herein. Telemetry unit 444 may represent a unit configured to obtain telemetric data from peers 409. Communication ("COMM") unit 446 may represent a unit configured to implement the various protocols by which to interface with router 36A/36B, such as NETCONF, REST, and/or RPC.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method of managing an address space across network elements, the method comprising:
   automatically distributing, by a network device configured to manage an address space across a first network element and a second network element, a first block of network addresses to the first network element acting, for a first network, as a first address allocation server to assign the first block of network addresses to a first set of client devices coupled to the first network;
   automatically distributing, by the network device, a second block of network addresses to the second network element acting, for a second network, as a second address allocation server to assign the second block of network addresses to a second set of client devices coupled to the second network;
   interfacing, by the network device, with the first address allocation server to determine a first number of available network addresses within the first block of network addresses that are available for allocation to first clients;
   interfacing, by the network device, with the second address allocation server to determine a second number of available network addresses within the second block of network addresses that are available for allocation to second clients; and
   dynamically managing, by the network device and based on the first number of available network addresses within the first block of network addresses that are available for allocation to the first clients and the second number of available network addresses within the second block of network addresses that are available for allocation to the second clients, a size of the first block of network addresses and a size of the second block of network addresses to address inefficient distribution of available network addresses within either or both of the first block of network addresses and the second block of network addresses.

2. The method of claim 1, wherein dynamically managing the size of the first block of network addresses and the size of the second block of network addresses comprises:
   determining that the first number of the available network addresses within the first block of network addresses is at or below a threshold;
   determining any requirements and rules associated with the first block of network addresses;
   obtaining, based on the requirements and rules, a third block of network addresses; and
   automatically assigning the third block of network addresses to the first network element.

3. The method of claim 1,
   wherein dynamically managing the size of the first block of network addresses and the size of the second block of network addresses comprises issuing a preemptive reclaim request in which the first network element must return a portion of the first block of network addresses distribution to another network element, and
   wherein the method further comprises obtaining an indication that the portion of the first block of network addresses has been reclaimed.

4. The method of claim 1, further comprising interfacing with the first network element to defragment a network address pool of network addresses that include the first block of network addresses.

5. The method of claim 1,
   wherein dynamically managing the size of the first block of network addresses and the size of the second block of network addresses comprises issuing a non-preemptive reclaim request requesting a portion of the first block of network addresses be returned for distribution to another network, and
   wherein the method further comprises obtaining an indication that the portion of the first block of network addresses has not been reclaimed.

6. The method of claim 1, further comprising interfacing with the first network element to migrate, from the first network element and to another network element, a network address pool of network addresses that includes the first block of network addresses.

7. The method of claim 1, wherein dynamically managing the size of the first block of network addresses and the size of the second block of network addresses comprises:
   creating a set of network elements that associates the first network element to the second network element; and
   jointly managing the size of the first block of network addresses and the size of the second block of network addresses by issuing requests to the set of network elements.

8. The method of claim 1, wherein dynamically managing the size of the first block of network addresses and the size of the second block of network addresses comprises automatically moving an assigned static network address that is associated with a particular client device from the first block of network addresses to the second block of network addresses responsive to the particular client device attempting to access the second network.

9. A network device configured to manage an address space across network elements, the network device comprising:
   one or more processors configured to execute a pool manager, the pool manager configured to:
   automatically distribute a first block of network addresses to a first network element acting, for a first network, as a first address allocation server to assign the first block of network addresses to a first set of client devices coupled to the first network;
   automatically distribute a second block of contiguous network addresses to a second network element acting, for a second network, as a second address allocation server to assign the second block of network addresses to a second set of client devices coupled to the second network;
   interface with the first address allocation server to determine a first number of available network addresses within the first block of network addresses that are available for allocation to first clients;
   interface with the second address allocation server to determine a second number of available network addresses within the second block of network addresses that are available for allocation to second clients; and
   dynamically manage, based on the first number of available network addresses within the first block of network addresses that are available for allocation to the first clients and the second number of available network addresses within the second block of network addresses that are available for allocation to the second clients, a size of the first block of network addresses and a size of the second block of network addresses to address inefficient distribution of available network addresses within either or both of the first block of network addresses and the second block of network addresses;

wherein the one or more processors are configured to issue a preemptive reclaim request in which the first network element must return a portion of the first block of network addresses distribution to another network element, and wherein the one or more processors are further configured to obtain an indication that the portion of the first block of network addresses has been reclaimed.

10. The network device of claim 9, wherein the one or more processors are configured to:
determine that the first number of the available network addresses within the first block of network addresses is at or below a threshold;
determine any requirements and rules associated with the first block of network addresses;
obtain, based on the requirements and rules, a third block of network addresses; and
automatically assign the third block of network addresses to the first network element.

11. The network device of claim 9, wherein the one or more processors are further configured to interface with the first network element to defragment a network address pool of network addresses that include the first block of network addresses.

12. The network device of claim 9,
wherein the one or more processors are configured to issue a non-preemptive reclaim request requesting a portion of the first block of network addresses be returned for distribution to another network, and
wherein the one or more processors are further configured to obtain an indication that the portion of the first block of network addresses has not been reclaimed.

13. The network device of claim 9, wherein the one or more processors are further configured to interface with the first network element to migrate, from the first network element and to another network element, a network address pool of network addresses that include the first block of network addresses.

14. The network device of claim 9, wherein the one or more processors are configured to:
create a set of network elements that associates the first network element to the second network element; and
jointly manage the size of the first block of network addresses and the size of the second block of network addresses by issuing requests to the set of network elements.

15. The network device of claim 9, wherein the one or more processors are configured to automatically move an assigned static network address that is associated with a particular client device from the first block of network addresses to the second block of network addresses responsive to the particular client device attempting to access the second network.

16. A method of distributing a first block of network addresses, the method comprising:
receiving, by a network address manager proxy executed by a first network element responsible for allocating the first block of network addresses within a first network and from a network address manager executed by a computing device, an allocation of the first block of network addresses;
interfacing, by the network address manager proxy and with the network address manager, to specify a first number of available network addresses within the first block of network addresses that are available for allocation to first clients;
receiving, by the network address manager proxy and from the network address manager responsive to specifying the first number of available network addresses, one or more requests that manage a size of the first block of network addresses to address inefficient distribution of available network addresses within either or both of the first block of network addresses or a second block of network addresses distributed by a second network device for a second network; and
adapting, by the network address manager proxy and responsive to the one or more requests, the size of the first block of network addresses.

17. The method of claim 16,
wherein the one or more requests include a preemptive reclaim request indicating that the network device must release a portion of the first block of network addresses,
wherein the first block of network addresses includes a first block of contiguous network addresses,
wherein adapting the size of the block of network addresses includes selecting the portion of the first block of contiguous network addresses as one or more sub-portions of the first block of contiguous network addresses that divides the first block of contiguous network addresses into two or more sub-blocks of contiguous network addresses, and
wherein adapting the size of the first block of network addresses includes releasing, responsive to preemptive reclaim request, the one or more sub-portions of the first block of contiguous network addresses.

\* \* \* \* \*